US006741282B1

(12) United States Patent
Morris

(10) Patent No.: US 6,741,282 B1
(45) Date of Patent: May 25, 2004

(54) METHOD AND APPARATUS FOR PROCESSING A PHOTOCURRENT IN BOTH DISCRETE AND CONTINUOUS TIME

(75) Inventor: Tonia G. Morris, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 874 days.

(21) Appl. No.: 09/072,758

(22) Filed: May 5, 1998

(51) Int. Cl.$^7$ .............................................. H04N 5/335
(52) U.S. Cl. ...................................................... 348/308
(58) Field of Search ................................. 348/362, 308, 348/300, 301, 307, 309, 310, 222, 302, 306, 222.1; 250/208.1; 257/291, 292, 293

(56) References Cited

U.S. PATENT DOCUMENTS

| | | | | |
|---|---|---|---|---|
| 5,220,398 A | * | 6/1993 | Horn et al. ............... | 250/208.2 |
| 5,262,871 A | * | 11/1993 | Wilder et al. ............. | 348/308 |
| 5,376,813 A | * | 12/1994 | Delbruck et al. .......... | 257/288 |
| 5,471,515 A | * | 11/1995 | Fossum et al. ............ | 257/239 |
| 5,563,405 A | | 10/1996 | Woolaway, II et al. | |
| 5,572,074 A | * | 11/1996 | Standley .................. | 307/117 |
| 5,619,262 A | * | 4/1997 | Uno ........................ | 348/308 |
| 5,625,412 A | | 4/1997 | Aciu et al. | |
| 5,631,704 A | | 5/1997 | Dickinson et al. | |
| 5,699,278 A | * | 12/1997 | Brajovic ................... | 364/525 |
| 5,929,800 A | * | 7/1999 | Zhou et al. .............. | 341/161 |
| 5,998,780 A | * | 12/1999 | Kramer .................... | 250/221 |

OTHER PUBLICATIONS

Aizawa et al., "On Sensor Compression for High Pixel Rate Imaging"; 1996 IEEE/SICE/RSJ International Conference on Multisensor Fusion and Integration for Intelligent Systems; pp. 201–207.*

Kawahito et al., "COMOS Image Sensors With Video Compression", Feb. 10–13, 1998, Dept. of Inf. & Comput. Sci., Toyohashi Univ. of Technol., Japan, IEEE Catalog No. 98EX121; pp. 595–600.*

Andreou, Andreas G. and Boahen, Kwabena A.; "A 590,000 Transistor 48,000 Pixel, Contrast Sensitive, Edge Enhancing, Cmos Imager—Silicon Retina—"; 1995; pp. 225–239.

Aw, Chye Huat and Wooley, Bruce A., Fellow, IEEE; "A 128×128–Pixel Standard–CMOS Image Sensor with Electronic Shutter"; *IEEE Journal of Solid–State Circuits*, vol. 31, No. 12, Dec. 1996; pp. 1922–1930.

Brajovic, Vladimir and Kanade, Takeo; "A Sorting Image Sensor: An Example of Massively Parallel Intensity–to–Time Processing for Low–Latency Computational Sensors"; 1996; pp. 1648–1643.

Dickinson, Alex; Ackland, Bryan; Eid, El–Sayed; Inglis, David; and Fossum, Eric R.; "Standard CMOS Active Pixel Image Sensors for Multimedia Applications"; 1995; pp. 214–224.

(List continued on next page.)

*Primary Examiner*—Aung Moe
(74) *Attorney, Agent, or Firm*—Blakely, Sokoloff, Taylor & Zafman LLP

(57) ABSTRACT

An image sensing array having discrete and continuous time processing capabilities. Integration of a photocurrent is used to produce a high resolution digital image. By also employing continuous time processing of the photocurrent within the image sensing array, the robustness of the imaging system is enhanced. The continuous time processing permits a number of low precision calculations that may be performed within the focal plane or on the edge of the focal plane without the addition of significant circuit complexity. In one embodiment, motion representation is improved through optical flow determination based on the continuous photocurrent. These same determinations may facilitate compression of image data by reducing a search area for moving objects within the image.

16 Claims, 5 Drawing Sheets

OTHER PUBLICATIONS

Funatsu, Eiichi; Nitta, Yoshikazu; Miyake, Yasunari; Toyoda, Takashi; Ohta, Jun; and Kyuma, Kazuo, Fellow, IEEE; "An Artificial Retina Chip with Current–Mode Focal Plane Image Processing Functions"; *IEEE Transactions on Electron Devices*, vol. 44, No. 10, Oct. 1997; pp. 1777–1782.

Hamamato, T.; Egi, Y.; Hatori, M.; Aizawa, K; Okubo, T.; Maruyama, H.; and Fossum, E.R.; "Computational Image Sensors for On–Sensor Compression"; *Proceedings of MicroNeuro '96*; pp. 297–304.

Kramer, Jörg; Sarpeshkar, Rahul; and Kock, Christof; "An Analog VLSI Velocity Sensor"; Proceeding of the IEEE International Symposium on Circuits and Systems, 1995, pp. 413–416.

\* cited by examiner

METHOD AND APPARATUS FOR PROCESSING A PHOTOCURRENT IN BOTH DISCRETE AND CONTINUOUS TIME

BACKGROUND OF THE INVENTION (1) Field of the Invention

The invention relates to digital imaging. More specifically, the invention relates to discrete and continuous time processing of photodata within a single image sensing array.

(2) Background

Image sensing arrays have existed for many years and are generally well known in the art. Generally, a plurality of light sensitive elements such as photodiodes are provided on a focal plane. During a reset phase, a node at one side of the photodiode is driven to a known voltage, while the other side of the diode is connected to a power rail. For example, the diode may be connected between ground and a node driven to $V_{CC}$ during reset. Incident light striking the photodiode causes a photocurrent to be generated which bleeds off that voltage. The photocurrent is continuously varying with time, dependent on the number of photons of the incident light striking the photosensitive element. During a sampling period, a capacitor sources the flow current thereby reducing the charge on the capacitor. The charge on the capacitor at the end of the sampling period is therefore an integration of the photocurrent during the sampling period. This value can then be read out on a bitline. The above is an example of typical discrete time processing used in numerous commercially available image sensing arrays to generate high precision digital images.

A second school of image processing has arisen in which the photocurrent rather than being integrated over a sampling period is processed in continuous time. Some examples are described in Kramer, Sarpeshkar, and Koch, "An Analog VLSI Velocity Sensor," *Proceedings of the IEEE International Symposium on Circuits and Systems*, pp. 413–416, 1995, and "A 590,000 Transistor 48,000 Pixel Contrast Sensitive, Edge Enhancing CMOS Sensor Silicon Retina," Andreou and Boahen, pp. 225–239: *Proceedings of the 16th Conference on Advanced Research in VLSI*, eds. W. J. Dally, J. W. Poulton, and A. T. Ishii, IEEE Computer Society Press, 1995. Continuous time processing of the photocurrent generally yields poor precision and therefore has not gained wide commercial acceptance.

BRIEF SUMMARY OF THE INVENTION

A method and apparatus for continuous and discrete time processing is disclosed. A light sensitive element generates a photocurrent related to an incident light level. The light sensitive element is coupled to both a continuous time processing circuit to process the photocurrent during a continuous segment of time and an integration circuit to generate a digital image related to an average photocurrent during a sampling period.

DETAILED DESCRIPTION OF THE INVENTION

An image sensing array (ISA) having both discrete time and continuous time processing capability permits production of a high quality digital image while also obtaining useful information that would be lost in a pure integration system found in the prior art. Traditionally, when the integration circuit is not integrating, no useful information is being collected from the light sensitive elements. In one embodiment of the invention, when integration is not occurring, continuous time processing of the photocurrent occurs, thereby obtaining valuable information about changes in the image between frames. By performing low resolution computations in continuous time, the robustness of the overall imaging system is enhanced.

Figure 1:
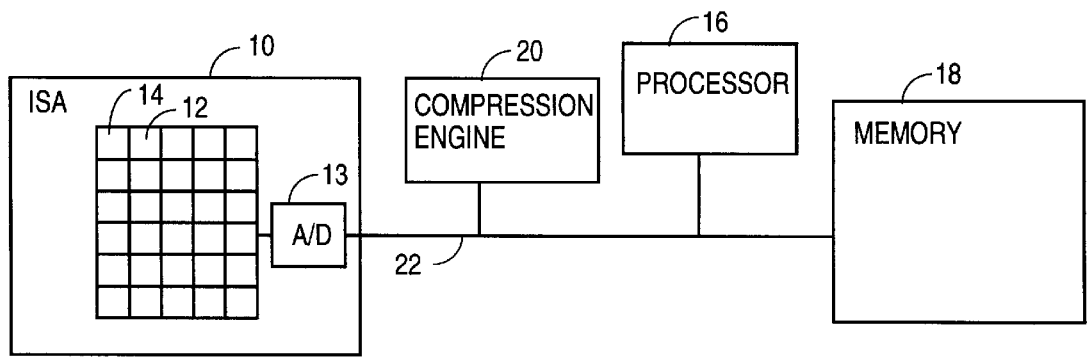
FIG. 1 is a block diagram of a system employing one embodiment of the invention.

FIG. 1 is a block diagram of a system of one embodiment of the invention. An ISA 10 includes the focal plane 12 comprising a plurality of pixels 14. An analog-to-digital converter (A/D) 13 is provided to convert analog image data to digital form. While the A/D 13 is shown as part of ISA 10 it may alternatively be implemented off chip. The ISA 10 is coupled to a memory 18 by a bus 22. A processor 16 and a compression engine 20 are also coupled to the bus 22. Compression engine 20 may be used to compress image data flowing from the ISA 10 prior to storage in the memory 18. Alternatively, the raw data may be stored in memory 18. The ISA 10 employs both continuous time processing of the photocurrent during some periods of time and discrete time integration to produce a high quality digital image. The continuous time processing provides relatively low precision computations which may be used to enhance other functionalities of the system. For example, optical flow calculation may be used to improve efficiency of the compression in the compression engine by reducing the search area for objects in motion. Identification of photocurrent variance permits simulation of shorter integration times to reduce blurring in the image resulting from widely varying photocurrents during the integrations. Various other averaging and filtering operations may also be performed.

Figure 2A:
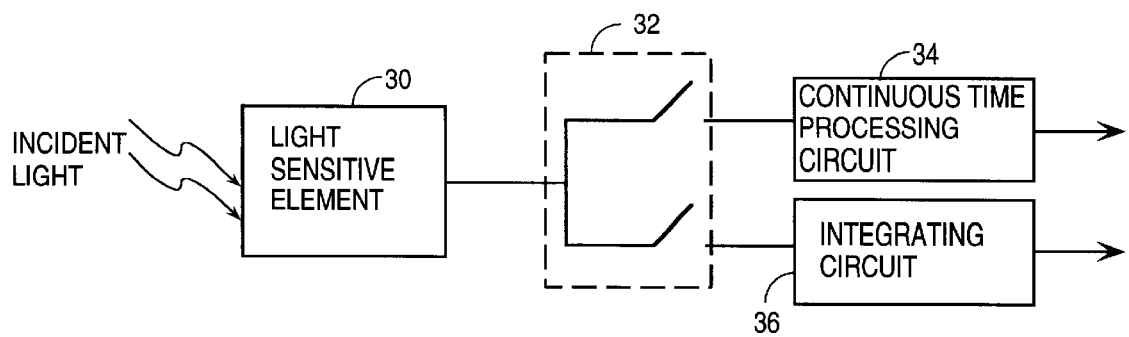
FIGS. 2a and 2b are block diagrams of alternative embodiments of a pixel of one embodiment of the invention.

FIG. 2a is a block diagram of a pixel of one embodiment of the invention. A light sensitive element 30 is coupled to a control switching circuit 32 which selects between providing the photocurrent to a continuous time processing circuit 34 or an integrating circuit 36. The continuous time processing circuit 34 processes the continuous time signal, in continuous time, when the photocurrent is directed by control switching circuit 32 to the continuous time processing circuit 34. When control switching circuit 32 provides the photocurrent to integrating circuit 36, the integrating circuit 36 integrates during the sampling period to generate a representation of the average light level at the light sensitive element during the sampling. Continuous time processing circuit 34 may be instantiated within the focal plane.

Figure 2B:
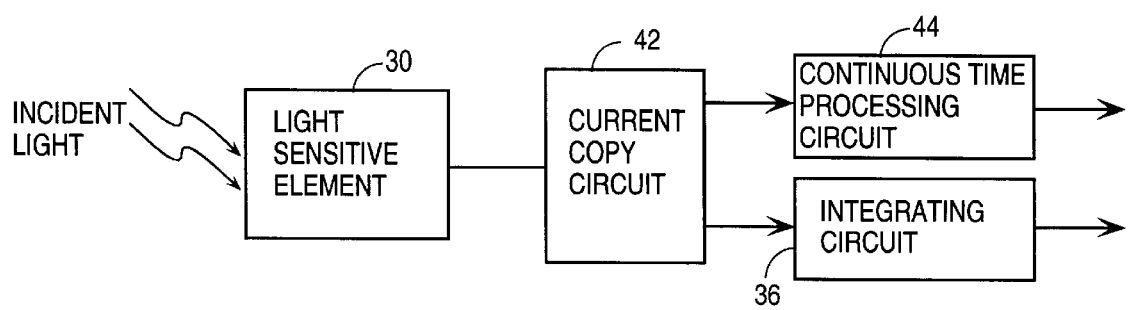

FIG. 2b is an alternative embodiment of a pixel of one embodiment of the invention. Light sensitive element 30 is coupled to a current copy circuit 42 which may be a current mirror. The current copy circuit 42 copies the photocurrent and provides one copy to the continuous time processing circuit 44 and one copy to the integrating circuit 36. In this manner, continuous time processing can be occurring concurrently with the integrating. The integrated value is converted by an A/D (not shown) to produce a digital image. The continuous time processing circuit 44 may be instantiated within the focal plane to provide low resolution computations with relatively small non-complex additional circuitry.

Several types of computations are possible in continuous time processing circuit 34, 44. Among the types of processing that might be performed by the continuous time processing circuit 34, 44 are optical flow calculations, including spatial and temporal derivatives, photocurrent variance, edge detection, segmentation, object orientation, silicon retina functions, as well as general filtering and averaging operations.

Figure 3:
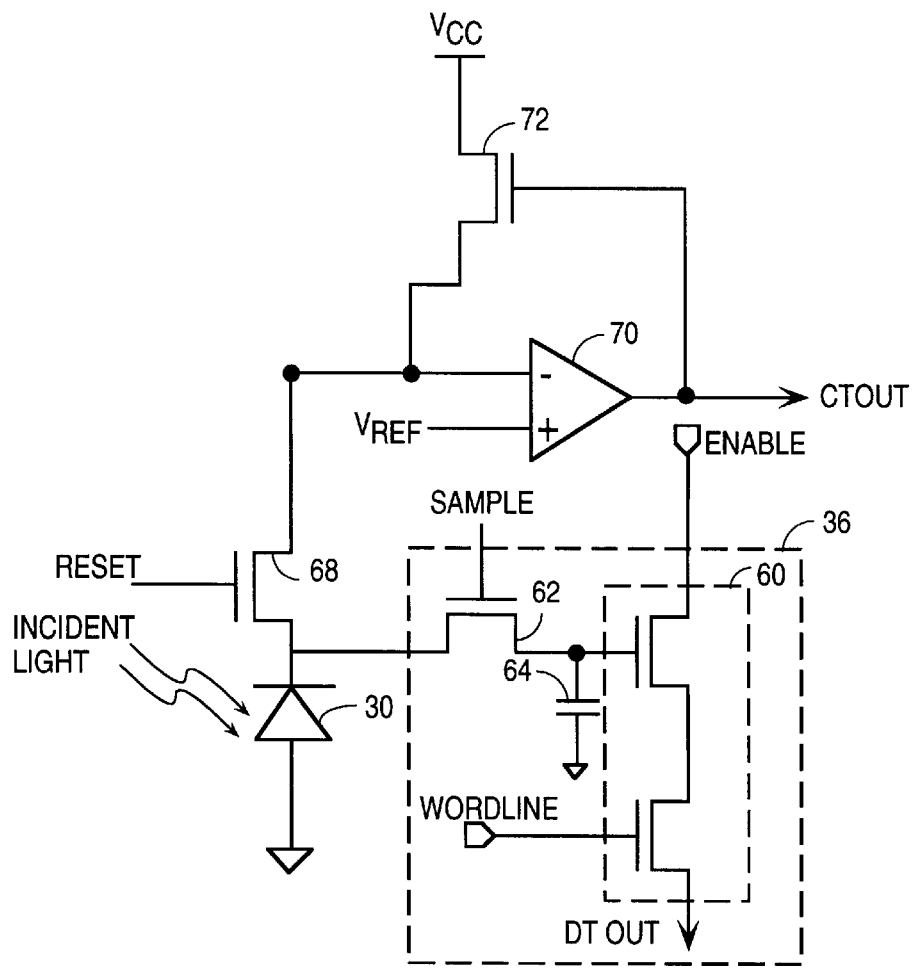
FIG. 3 is a partial pixel schematic diagram for one embodiment of the invention.

FIG. 3 is a partial pixel schematic for one embodiment of the invention. A light sensitive element 30 is coupled between a reset node and ground. A reset transistor 68 with its gate driven by a reset signal is coupled between the reset node and one input terminal of a transconductance amplifier 70. The second terminal of the transconductance amplifier 70 is coupled to a constant voltage reference ($V_{ref}$) for example, power supply $V_{CC}$. A feedback transistor 72 with its gate driven by the output of the transconductance amplifier 70 has its source coupled to $V_{CC}$ and its drain coupled to the same input of the transconductance amplifier 70 as the reset transistor 68. In this manner, an output of the transconductance amplifier 70 is an encoding of the photocurrent while the reset signal is asserted. Thus, CTOUT is representative of the photocurrent during reset and is appropriately processed by the continuous time processing circuit (not shown).

Also coupled to the reset node is the integrating circuit 36. A sampling transistor 62 with its gate driven by a sample signal is coupled between the reset node and the storage element such as capacitor 64. When the sample signal is asserted and therefore sampling transistor 62 is turned on, capacitor 64 is free to charge or discharge, as the case may be, through the reset node. The period during which the sample signal is asserted (and the reset signal is not asserted) is known as the sampling period. A source follower 60 is employed to permit the readout of the integration from a sampling period.

In this embodiment, integration occurs during the sampling period and continuous time processing occurs while reset is asserted. For purposes of this disclosure, even though the continuous time processing occurs in segments separated by sampling periods, it is still deemed continuous time processing because the continuously varying photocurrent is the subject of the processing rather than an integration over a period of time.

Figure 4:
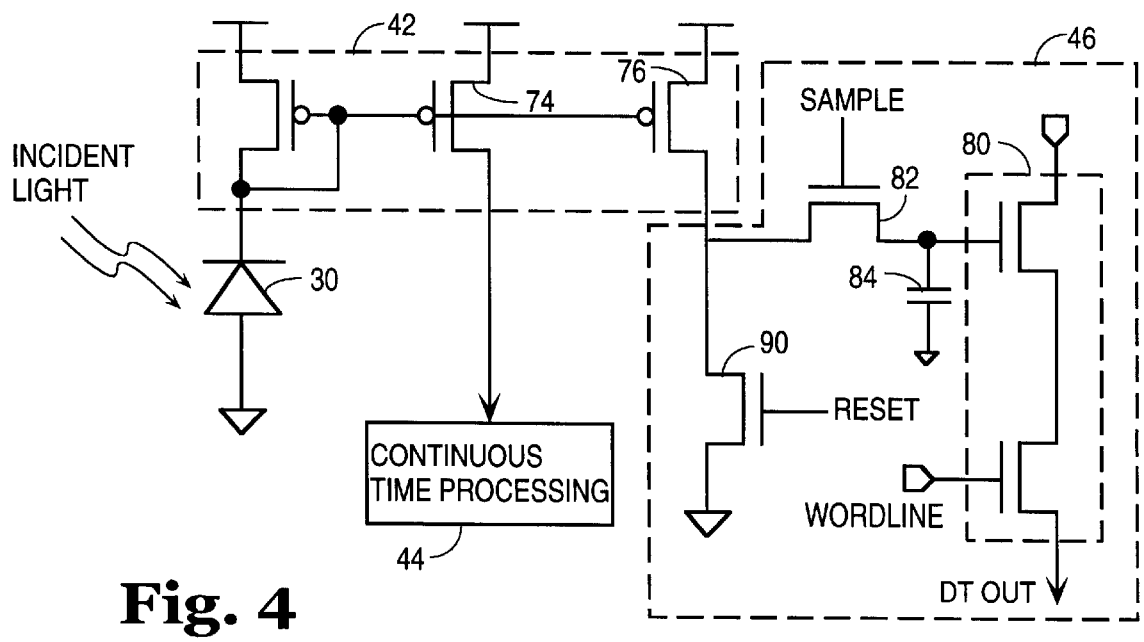
FIG. 4 is a partial pixel schematic diagram for a second embodiment of the invention.

FIG. 4 shows a partial pixel schematic of an alternative embodiment of the invention. In this embodiment, a light sensitive element 30 is coupled between ground and a current copy circuit 42. In this case, a current mirror having a first mirroring transistor 74 and a second mirroring transistor 76 to create two duplicates of the photocurrent. The first duplicate of the photocurrent created by mirroring transistor 74 is provided to continuous time processing circuit 44, while the current mirrored through mirroring transistor 76 is provided to integrating circuit 46. Care should be taken to ensure accurate mirroring of the photocurrent, close transistors between mirroring transistors 74 and 76, should be used and the impedance seen by those transistors should be similar. Integrating circuit 46 includes a sampling transistor 82, a capacitor 84, and a source follower 80 configured as in the embodiment of FIG. 3 above. A reset transistor 90 is coupled between the drain of mirroring transistor 76 and ground. When the reset signal is asserted and the sample signal is asserted the sampling and collection nodes are reset to a known voltage.

Figure 5:
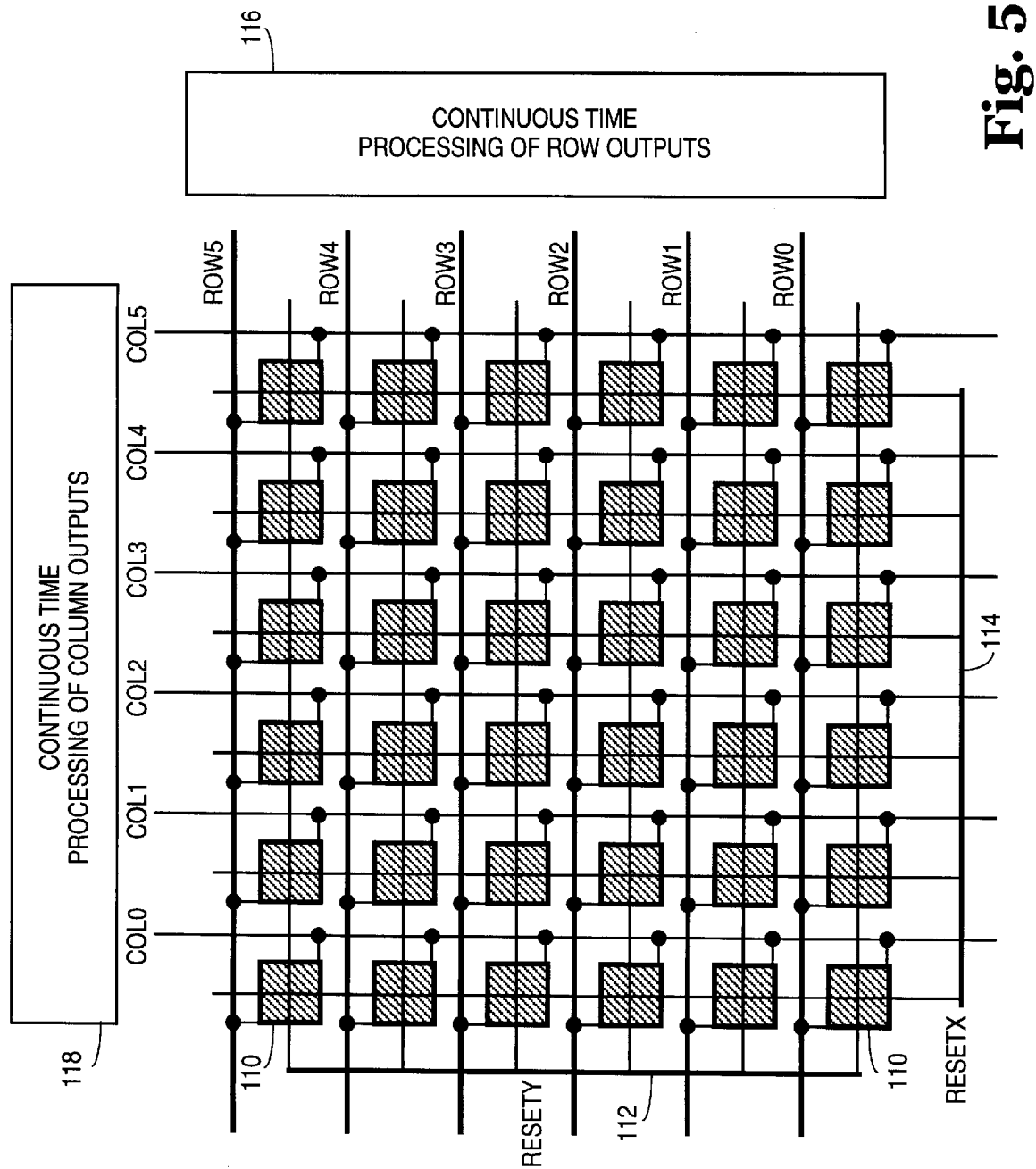
FIG. 5 is a block diagram of an image sensing array of one embodiment of the invention.

FIG. 5 is a block diagram of an image sensing array of one embodiment of the invention. In this embodiment, a plurality of pixels 110 are arranged in rows and columns. It is envisioned that some discrete and continuous time processing may occur within the focal plane. Additionally, the pixels in the rows and columns are coupled together so that all pixels in a row are coupled to row lines and all pixels in a column are coupled to column lines which provide inputs to continuous time row and column processing units 116 and 118, respectively. This edge processing is suitable for two dimensionally separable operations. The continuous photocurrent fed onto the row or column lines adds together for all pixels in the row or column creating an aggregate photocurrent with the subset of pixels comprising the row or column. In this embodiment, two resets, RESETX 114 and RESETY 112, are provided. When RESETX is asserted, the row lines are active and when RESETY is asserted, the column lines are active. Row and column processing enables such functions as centroid identification without requiring the circuitry for such processing within the focal plane. In this manner, any detrimental effect on fill factor can be reduced or eliminated. For example, if no pixel by pixel continuous time processing within the focal plane is desired, the transconductance amplifier of the embodiment shown in FIG. 3, and its feedback transistor, may be instantiated within the continuous time processing circuits used for the row and column processing outside of the focal plane.

Figure 6:
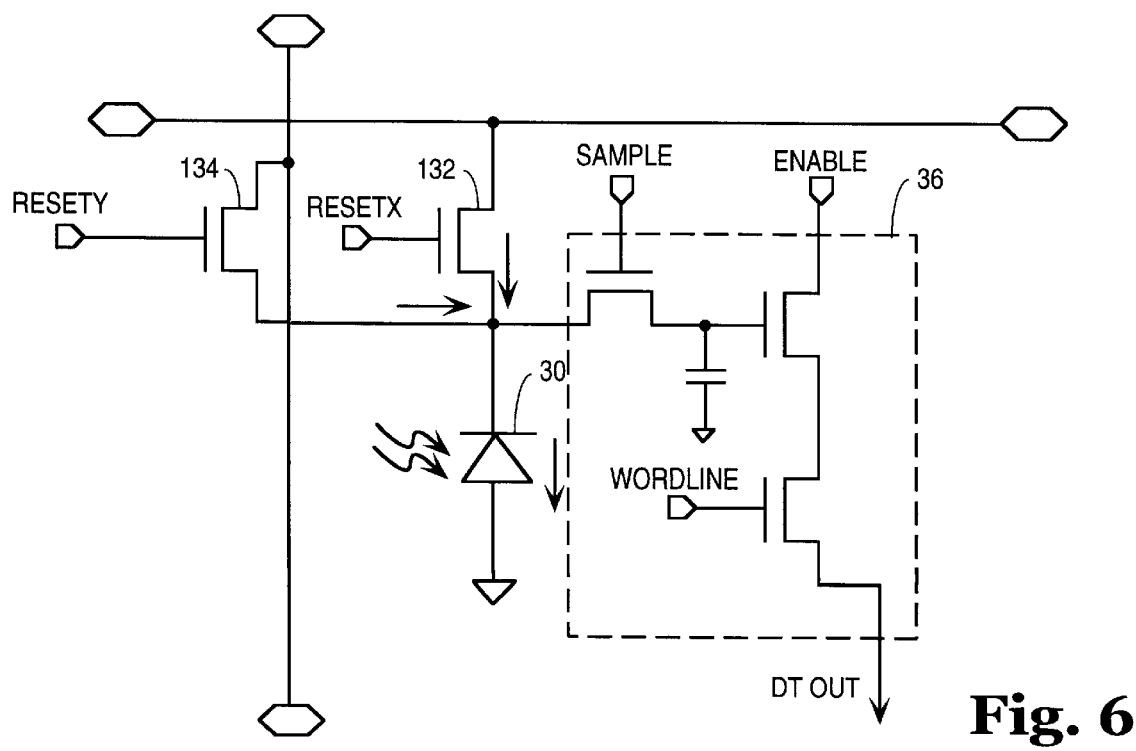
FIG. 6 is a partial pixel schematic diagram for another alternative embodiment of the invention.

FIG. 6 shows partial pixel schematic of one embodiment of the invention in which the continuous time processing does not occur within the focal plane. A RESETX transistor 132 and a RESETY transistor 134 are both provided coupled via the reset node to light sensitive element 30. If either RESETX or RESETY are asserted, the pixel is then reset and the continuous photocurrent is supplied to the corresponding row or column line. The integration portion of this pixel is the same as shown in FIG. 3.

In one alternative embodiment the aggregate of all photocurrents for all light-sensitive elements in the ISA is used for premetering during the reset phase. The purpose of premetering is to determine an overall intensity of incident light at the focal plane. Existing devices use a photo diode separate from the focal plane for premetering.

Figure 7:
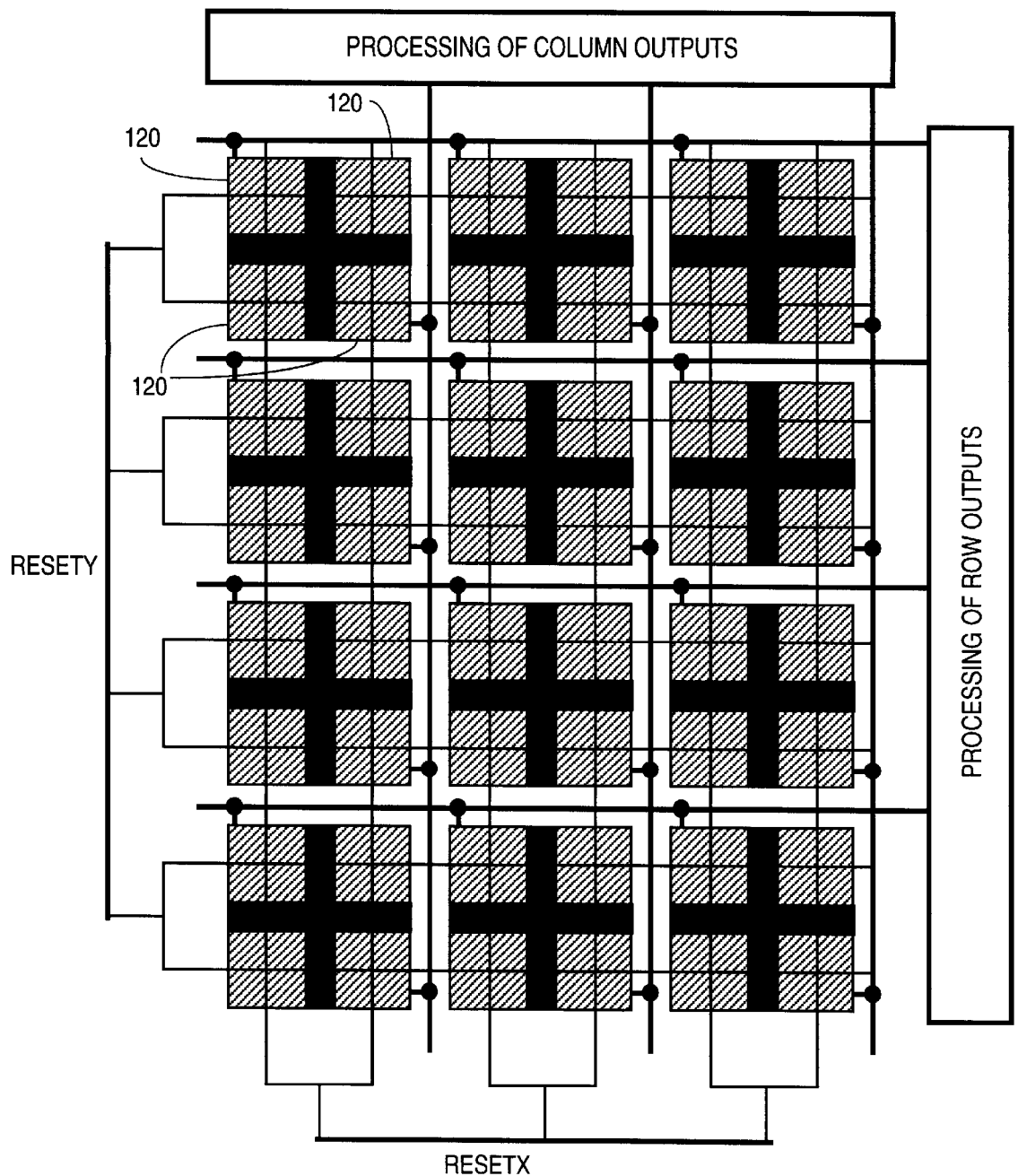
FIG. 7 is a block diagram of an image sensing array of a second embodiment of the invention.

FIG. 7 shows an alternative embodiment of an image sensing array of the invention. In this embodiment, subsets of pixels 120 are grouped together for continuous time processing purposes. Again, as in the embodiment shown in FIG. 5, processing may be done in rows and columns in addition, or as well as, within the focal plane. By grouping the pixels into, for example, two by two subsets, the spatial resolution is somewhat reduced over a case of individual pixels. For example, the two by two grouping results in an image that is half the spatial resolution in the continuous time context as in the discrete time context. Nevertheless, significant improvement in the signal to noise ratio can be achieved because the photocurrent (signal) of each pixel in the subset is aggregated together to form an aggregate photocurrent. Thus, the signal becomes large without a corresponding increase in noise. As the signal to noise ratio increases, improved continuous time calculations are possible. Additionally, supersets of these subsets can be read out on row and column lines for processing along the edge of the focal plane. Other groupings are also within the scope and contemplation of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. An apparatus comprising:
    a light sensitive element that generates a photocurrent related to an incident light level;
    an integration circuit coupled to the light sensitive element to compute an average of the photocurrent during a sampling period to permit creation of a digital image; and
    a continuous time processing circuit coupled to the light sensitive element to receive and process the photocurrent during at least a continuous segment of time, the continuous time processing interpreting an aspect of the digital image.

2. The apparatus of claim 1 wherein the continuous time processing circuit is integrated as part of a focal plane.

3. The apparatus of claim 1 wherein the continuous time processing circuit performs one of: centroid determination, orientation determination; temporal derivative calculations; spatial derivative calculations, optical flow calculations, edge detection; silicon retina function; feature detection, and segmentation.

4. The apparatus of claim 1 further comprising:
    a current mirror coupled between the light sensitive element and both of the continuous processing circuit and the integration circuit.

5. The apparatus of claim 1 further comprising:
    a reset circuit including a current measuring circuit that maintains a constant reset voltage; and
    a control switch to control which of the continuous time processing circuit and the integration circuit receives the photocurrent.

6. The apparatus of claim 5 wherein the control switch is activated by a reset signal to direct the photocurrent to the continuous time processing circuit when the reset signal is asserted.

7. The apparatus of claim 5 wherein the current measuring circuit comprises a transconductance amplifier.

8. The apparatus of claim 1 further comprising:
    a plurality of additional light sensitive elements subsets of which are coupled together such that an aggregate photocurrent is generated for input into the continuous time processing circuit.

9. The apparatus of claim 1 wherein subsets of pixels are coupled together such that a photocurrent corresponding to each pixel in the subset form an aggregate photocurrent for continuous time processing.

10. The apparatus of claim 9 wherein a subset is one of a row, a column, and a two-dimensional subsection of the surface.

11. The apparatus of claim 9 wherein each pixel comprises a current mirror to copy the photocurrent.

12. A method comprising the steps of:
    generating a plurality of photocurrents by exposing a plurality of light sensitive elements to incident light;
    integrating the plurality of photocurrents to produce an image corresponding to average light levels at the plurality of light sensitive element during a sampling period; and
    performing continuous time processing on the plurality of photocurrents within an image sensing array, the continuous time processing interpreting an aspect of the image.

13. The method of claim 12 further comprising the step of:
    copying the plurality of photocurrents to permit concurrent continuous time processing and integration.

14. The method of claim 12 wherein the step of continuous time processing comprises:
    accumulating photocurrents of a predefined subset of the light sensitive elements into an aggregate photocurrent.

15. The method of claim 12 wherein the continuous time processing occurs within a focal plane.

16. The method of claim 12 wherein the continuous time processing determines at least one of: a spatial derivative, a temporal derivative, a photocurrent variance, an object identification, an object centroid, an object orientation, an overall light intensity, and an optical flow.

* * * * *